United States Patent
Dokunikhin et al.

[11] 3,904,650
[45] Sept. 9, 1975

[54] 3,4,9,10-ANTHANTHRONETETRACARBOXYLIC ACID, ITS ANHYDRIDE AND METHOD OF PRODUCING SAME

[76] Inventors: Nikolai Stepanovich Dokunikhin, Presnensky val, 42, kv. 23; Georgy Nikolaevich Vorozhtsov, Sadovaya - Spasskaya ulitsa, 21, kv. 268; Valentina Petrovna Sarycheva, Varshavskoe Shosse, 188, korpus 1, kv. 36, all of Moscow, U.S.S.R.

[22] Filed: May 4, 1973

[21] Appl. No.: 357,275

[52] U.S. Cl. .................... 260/345.2; 260/515 P
[51] Int. Cl. .................... C07d 311/02; C07c 63/00
[58] Field of Search .................. 260/345.2, 515 P

[56] References Cited
UNITED STATES PATENTS

| | | | |
|---|---|---|---|
| 2,067,138 | 1/1937 | Eckert et al. | 260/345.2 X |
| 3,646,069 | 2/1972 | Okada et al. | 260/345.2 |

Primary Examiner—John M. Ford
Attorney, Agent, or Firm—Holman & Stern

[57] ABSTRACT

3,4,9,10-anthanthronetetracarboxylic acid and the anhydride thereof, are both the starting products for the manufacture of some dyes and pigments, which are produced by oxidizing a substances having the general formula

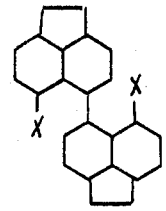

where X = COOH or COCH$_3$, with subsequent cyclization of the resultant 1,1'-dinaphthyl ,5,5',8,8'-hexacarboxylic acid or its anhydride due to the effect of a condensing agent in order to obtain said acid having the formula

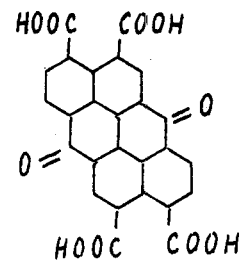

and the anhydride thereof.

4 Claims, No Drawings

3,4,9,10-ANTHANTHRONETETRACARBOXYLIC ACID, ITS ANHYDRIDE AND METHOD OF PRODUCING SAME

The present invention relates to 3,4,9,10-anthanthronetetracarboxylic acid, its anhydride and to a method of producing both.

3,4,9,10-anthanthronetetracarboxylic acid is the starting product for the synthesis of some pigments and dyes.

Aromatic carboxylic acids with carboxyl groups in the peri-positions (such as naphthalenetetracerboxylic, perilenetetracarbonic) are known to serve as intermediates for producing numerous fast and bright dyes and pigments. On the other hand, anthanthrone and its derivatives are known to be widely employed as dyes, too.

It is therefore an object of the present invention to provide novel products incorporating both the structure of the anthanthrone and the carboxyl groups in peri-positions, and suitable for producing pigments and dyes.

It is another object of the present invention to provide a method of producing 3,4,9,10-anthanthronetetracarboxylic acid and its anhydride.

According to the invention, provision is made for producing 3,4,9,10-anthanthronetetracarboxylic acid having the formula 1

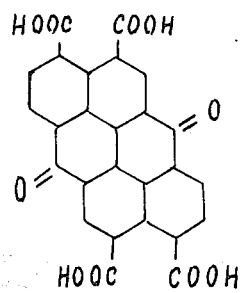

and its anhydride.

These compounds are novel ones and are not described in the literature. The compounds are powder-like, light-brown substances which do not melt up to 360°C. When exposed to the effect of an alkaline hydrosulphite solution, they form a bright-blue leuco-compound.

The presence of the compound of formula 1, in a molecule having the anthanthrone structure with four carboxyl groups in the peri-positions makes it possible to obtain a number of original compounds that combine the properties of the anthanthrone and those of peritetracarboxylic acids.

3,4,9,10-anthanthronetetracarboxylic acid changes into a leuco-compound in a way similar to anthanthrone, and when condensed with a variety of amines, it forms, like peritetracarboxylic acids, imides and imidazoles possessing the various properties. This enables a great number of novel compounds to be obtained on the basis of one starting product, viz., pigments and dyes having a diversity of applications.

According to the invention, anthanthronetetracarboxylic acid or its anhydride is obtained by oxidizing the compounds having the general formula II

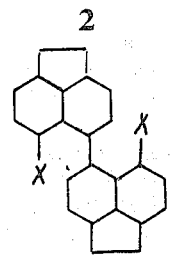

where X = COOH, COCH$_3$; followed by cyclization of the resultant 1,1'-dinaphthyl-4,4',5,5',8,8'-hexacarboxylic acid or the anhydride thereof by the action of acid condensing agents.

The term "acid condensing agents" implies acid-character compounds that ensure the formation of the anthanthrone structure from 1,1'-dinaphthyl-4,4',5,5',8,8'-hexacarboxylic acid or its anhydride by eliminating two molecules of H$_2$O and forming two new C—C bonds.

Oxidation of the compounds of formula II can be made in an acid or alkaline medium in a single stage if the X = COOH, and in two stages first in an acid medium, then in an alkaline medium if the X = COCH$_3$.

As an oxidant use is made of potassium permanganate, chromic anhydride, sodium hypochlorite, and some other oxidants suitable for the reaction.

The oxidation reactions may occur at normal pressure and room temperature, i.e., without heating. However, in order to accelerate the reaction, the process is preferably conducted at an elevated pressure, say, at 90°–100°C both in an acid and an alkaline media.

Cyclization of 1,1'-dinaphthyl-4,4',5,5',8,8'-hexacarboxylic acid or its anhydride can be carried out under the effect of, say, sulphuric acid, oleum monohydrate, phosphorus oxychloride, chlorosulphonic acid, etc.

The cyclization reaction may proceed at normal pressure and at room temperature (i.e., without heating). However, for a higher rate of reaction the process should preferably be run at an elevated temperature, say, at 60°–80°C depending upon the cyclizing agent.

The present invention is dislosed in the following illustrative examples:

EXAMPLE 1 a. The production of an anhydride of 1,1'-dinaphthyl-8,8'-diacetyl-4,4',5,5'-tetracarboxylic acid.

5.0 g of 5,5'-diacenaphthenyl-6,6'-diacetyl are dissolved while heating in 115 ml of acetic acid, 8 ml of water are added thereto, the solution is then brought to the boiling point and a solution of chromium trioxide in 15 ml of water is batchwise added thereto, whereupon the solution is boiled for 1 hour. While maintaining same at the boiling point, 300 ml of water are poured into the boiling reaction mass, the latter is cooled and left standing overnight. The resultant precipitate is filtered off, washed with water and dried at 140°–150°C in order to obtain 3.55 g of the anhydride of 1,1'-dinaphthyl-8,8'-diacetyl-4,4',5,5'-tetracarboxylic acid.

Upon recrystallization from dioxane the final product assumes the form of light-yellow needles which do not melt at 360°C.

Found in % are: C, 70.30, 70.22; H, 2.90, 3.07
C$_{28}$H$_{14}$O$_8$. Calculated %: C, 70.31; H, 2.94

(b). The production of 1,1'-dinaphthyl-4,4',5,5',8,8'-hexacarboxylic acid and the anhydride thereof.

A suspension of 1.6 g of the anhydride of 1,1'-dinaphthyl-8,8'-diacetyl-4,4',5,5'-tetracarboxylic acid in 30 ml of water are mixed with 15 ml of a sodium hypochlorite solution (the content of active chlorine being 12 percent, sodium hydroxide, 7 percent). Then the reaction mass is stirred for 2 hours at 25°C, filtered in order to get rid of admixtures, then heated to a boiling point, cooled and, after the excess sodium hypochlorite has been eliminated with a bisulphite solution, it is acidified with hydrochloric acid until an acid solution is reached as designated by Congo test paper. The next day the precipitate is filtered off, washed with water and dried at room temperature.

As a result, 1.2 g of 1,1'-dinaphthyl-4,4',5,5',8,8'-hexacarboxylic acid are obtained.

Upon drying at 160°C, 1.1g of the anhydride of 1,1'-dinaphthyl-4,4',5,5',8,8'-hexacarboxylic acid are obtained in the form of a light-yellow substance that does not melt at 360°C.

Found, in % are: C, 64.23, 64.38; H, 1.98, 2.23; $C_{26}H_{10}O_{10}$. Calculated %: C, 64.75 H, 2.09. IR spectrum data, cm$^{-1}$ KBr, 1500–1800 cm$^{-1}$: 1522, 1600, 1745, 1780.

c. The production of 3,4,9,10-anthanthronetetracarboxylic acid and the anhydride thereof.

1.0 g of the anhydride of 1,1'-dinaphthyl-4,4',5,5',8,8'-hexacarboxylic acid is dissolved in 10 ml of a 100-percent sulphuric acid (monohydrate), then heated to 60°C and kept at that temperature for 2 hours, whereupon the reaction mass is poured onto a mixture of water and ice (150 ml). The precipitate is filtered off and washed with water to a neutral reaction. The resultant paste is dissolved in 30 ml of a 5-percent NaOH solution, filtered off and acidified with hydrochloric acid to an acid solution as exhibited against Congo test paper. The precipitate is filtered off, washed with water and dried at room temperature in order to obtain 0.9 g of 3,4,9,10-anthanthronetetracarboxylic acid. The product is then dried at 160°C to obtain 0.85 g of the anhydride of 3,4,9,10-anthanthronetetracarboxylic acid.

Upon recrystallization of the latter from nitrobenzene the substance assumes the form of light-brown needles that do not melt at 360°C.

Found in % are: C, 70.19, 70.01; H, 1.46, 1.39 $C_{26}H_6O_8$. Calculated %: C, 69.96 H, 1.35. IR spectrum data, cm$^{-1}$ (liquid petrolatum, 1500–1800 cm$^{-1}$: 1529, 1565, 1603, 1672, 1785.

EXAMPLE 2

A suspension of 48 g of 5,5'-diacenaphehtnyl-6,6'-diacetyl in 600 ml of a 35-percent sulphuric acid at 40°C are added batchwise with 400 g of sodium bichromate while concurrently elevating the temperature of the reaction mass to 90°–95°C. Upon charging the whole amount of oxidant, the reaction mass is kept at 95°C for 1.5 hours. Then the reaction mass is twofold diluted with water, the precipitate is filtered off, washed with water a neutral solution as exhibited against Congo test paper and dried at 160°C to obtain 41 g of the anhydride of 1,1'-dinaphthyl-8,8'-diacetal-4,4',5,5'-tetracarboxylic acid. Further, the process proceeds as described in Examples 1b and 1c.

EXAMPLE 3 a. The production of the anhydride of 1,1'-dinaphthyl-4,4',5,5',8,8'-hexacarboxylic acid.

4.0 g of 5,5'-diacentaphthyl-6,6'-dicarboxylic acid are suspended in 100 ml of water, heated to 60°C, and at that temperature 14.0 g of of potassium permanganate are added batchwise thereto over 1 hour, with the resulting medium being a weakly alkaline one. Once the whole amount of the oxidant has been added, the reaction mass is heated to the boiling point, filtered off, and the precipitate is washed with hot water. The filtrate and the washings are intermixed and acidified to an acid solution as exhibited against Congo test paper. The precipitate is filtered off, washed with a small amount of water and dried at 160°C.

The thusly obtained are 2.6 g of light-yellow anhydride of 1,1'dinaphthyl-4,4',5,5',8,8'-hexacarboxylic acid does not melt at 360°C. The IR spectrum thereof coincides with that of the product obtained according to Example 1b.

b. The production of the anhydride of 3,4,9,10-anthanthronetetracarboxylic acid.

2.5 g of the anhydride of 1,1'-dinaphthyl-4,4',5,5',8,8'-hexacarboxylic acid are suspended in 50 ml of phosphorus oxychloride and heated to 80°C, and then kept at that temperature for 1 hour. Then the reaction mass is poured onto water and the precipitate (coloured brown) is filtered, washed with water to a neutral solution and dried at 160°C in order to obtain 1.6 g of the anhydride of 3,4,9,10-anthanthronetetracarboxylic acid. Upon recrystallization from nitrobenzene, the final product has the same IR spectrum as the product obtained in Example 1c.

EXAMPLE 4 a. The production of the anhydride of 1,1'-dinaphthyl-4,4',5,5',8,8'-hexacarboxylic acid.

A suspension of 7.0 ml of 5,5'-diacenaphthenyl-6,6'-dicarboxylic acid is added batchwise over 1.5 hours with a solution of 19.0 g of chromium trioxide in 20 ml of water, while gradually raising the temperature to 80°–90°C.

Upon completion of the chromium trioxide addition and the disappearance of the excess amount of the oxidant, the reaction mass is filtered and, the precipitate is washed with water to heutral solution and then dried at 160°C in order to obtain 4.3 g of the light-yellow coloured anhydride of 1,1'-dinaphthyl-4,4',5,5',8,8'-hexacarboxylic acid.

The reaction proceeds in a similar way when equivalent quantities of potassium bichromate or sodium bichromate are used as an oxidant, as well as when the reaction runs in a medium of from 25–60 percent sulphuric acid.

b. The production of 3,4,9,10-anthanthronetetracarboxylic acid anhydride.

2.5 g of 1,1'-dinaphthyl-4,4',5,5',8,8'-hexacarboxylic acid anhydride are dissolved in 50 ml of chlorosulphonic acid at 25°–30°C and kept at that temperature for 1 hour. Then the reaction mass is poured onto ice, and the precipitate (coloured brown) is filtered, washed to neutral solution and dried at 160°C in order to obtain 2.0 g of 3,4,9,10-anthanthronetetracarboxylic acid anhydride. The cyclization process proceeds similarly under the effect of oleum.

EXAMPLE 5 a. A suspension of 48.0 g of 5,5'-diacenaphthenyl-6,6'-diacetyl in 500 ml of a 25-percent sulphuric acid at 40°C is added batchwise with a solution of 135 g of chromium trioxide in 250 ml of a 25-percent sulphuric acid. The temperature of the reaction mass is gradually elevated to 90°–95°C. Upon charging the entire amount of the oxidant, the reaction mass is kept at 95°C for 1.5 hours. Then the reaction mass is twofold-diluted with water, the precipitate is filtered, washed with water to neutral solution as exhibited against Congo test paper and dried at 150°–160°C in order to obtain 44.0 g of 1,1'-dinaphthyl-8,8'-diacetyl-4,4',5,5'-tetracarboxylic acid. Further, oxidation with sodium hypochlorite proceeds as described in Example 1b.

The IR spectrum of the thus-obtained product coincides with that of the compound resulting from Example 1b.

b. 2.5 g of 1,1'-dinaphthyl-4,4',5,5',8,8'-hexacarboxylic acid anhydride are dissolved in 100 ml of a 94-percent sulphuric acid, the solution is heated to 80°C and kept at that temperature for 1.5 hours. Then the reaction mass is poured onto water, and the precipitate is filtered, washed with water to neutral reaction and dried at 160°C in order to obtain 2.1 g of 3,4,9,10-anthanthronetetracarboxylic acid anhydride.

The IR spectrum of the product is the same as the product obtained in Example 1c.

What is claimed is:

1. 3,4,9,10-anthanthronetetracarboxylic acid of the formula

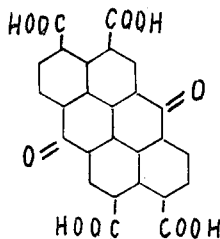

and the anhydride thereof.

2. A method of producing the compounds as claimed in claim 1, comprising oxidizing the compounds of the formula:

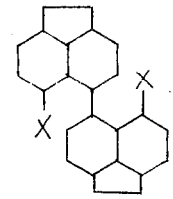

where X is COOH or COCH$_3$, to the corresponding 1,1'-dinaphthyl-4,4',5,5',8,8'-hexacarboxylic acid or its anhydride and cyclizing said corresponding acid or anhydride.

3. A method as claimed in claim 2, wherein said compound is oxidized by the action of an oxidizing agent selected from the group consisting of potassium permanganate, chromic anhydride, and sodium hypochlorite.

4. A method as claimed in claim 2, wherein said corresponding acid or anhydride is cyclized by treating the same with an acid condensing means selected from the group consisting of sulphuric acid, phosphorous oxychloride, and chlorosulphonic acid.

* * * * *